United States Patent [19]
Lamont

[11] 4,096,835
[45] Jun. 27, 1978

[54] INTERNAL COMBUSTION ENGINE METHOD AND APPARATUS

[76] Inventor: Charles Edward Lamont, 70 Ethelbert St., Winnipeg, Canada, R3G 1V3

[21] Appl. No.: 756,600

[22] Filed: Jan. 4, 1977

[51] Int. Cl.² .................. F02B 75/18; F02B 3/04; F02B 75/36; F02F 1/22
[52] U.S. Cl. .................. 123/52 B; 123/32 B; 123/33 VC; 123/48 R; 123/193 C; 123/193 H; 123/193 P
[58] Field of Search ............ 123/32 B, 52 B, 33 VC, 123/28, 29, 48 R, 48 C, 191 R, 191 C, 193 R, 193 H, 193 C, 193 CP, 193 CH

[56] References Cited

U.S. PATENT DOCUMENTS

| 1,139,713 | 5/1915 | Osterman | 123/52 B |
| 1,309,891 | 7/1919 | Griffith | 123/52 B |
| 3,929,107 | 12/1975 | Renger | 123/32 B |
| 3,969,894 | 7/1976 | Bachmann | 123/52 B |
| 4,011,841 | 3/1977 | Sato et al. | 123/32 B |

FOREIGN PATENT DOCUMENTS

| 557,373 | 10/1922 | France | 123/191 R |
| 690,583 | 9/1930 | France | 123/33 |
| 28,236 | 10/1917 | Norway | 123/33 |

*Primary Examiner*—Charles J. Myhre
*Assistant Examiner*—P. S. Lall
*Attorney, Agent, or Firm*—Burns, Doane, Swecker & Mathis

[57] ABSTRACT

A piston cylinder assembly is disclosed which may be used in new internal combustion engines of various types and which may be used to retrofit existing types of internal combustion engines so as to provide a high thermodynamic cycle efficiency and to substantially reduce the volume of pollutant gases exhausted from the engine. The assembly includes a piston having a centrally positioned generally circular first piston surface which is surrounded by a generally concentric annular second piston surface. The first and second piston surfaces are separated by an annular groove which accommodates a cylindrical wall of a cylinder assembly. The piston reciprocates in the fixed cylinder assembly and cooperates with the cylinder assembly to define an annular expansion/exhaust chamber. Reciprocably mounted with respect to the cylinder assembly is a movable head assembly which cooperates with the cylinder assembly and the piston to define a centrally disposed intake/compression chamber. The cylindrical wall includes a port which is valved by the movable head assembly to control communication between the intake/compression chamber and the expansion/exhaust chamber. Movement of the movable head assembly is also adapted to schedule the compression of the central chamber. The maximum volume of the expansion/exhaust chamber is selected to reduce pressure of combustion products to a value near or below ambient pressure.

23 Claims, 12 Drawing Figures

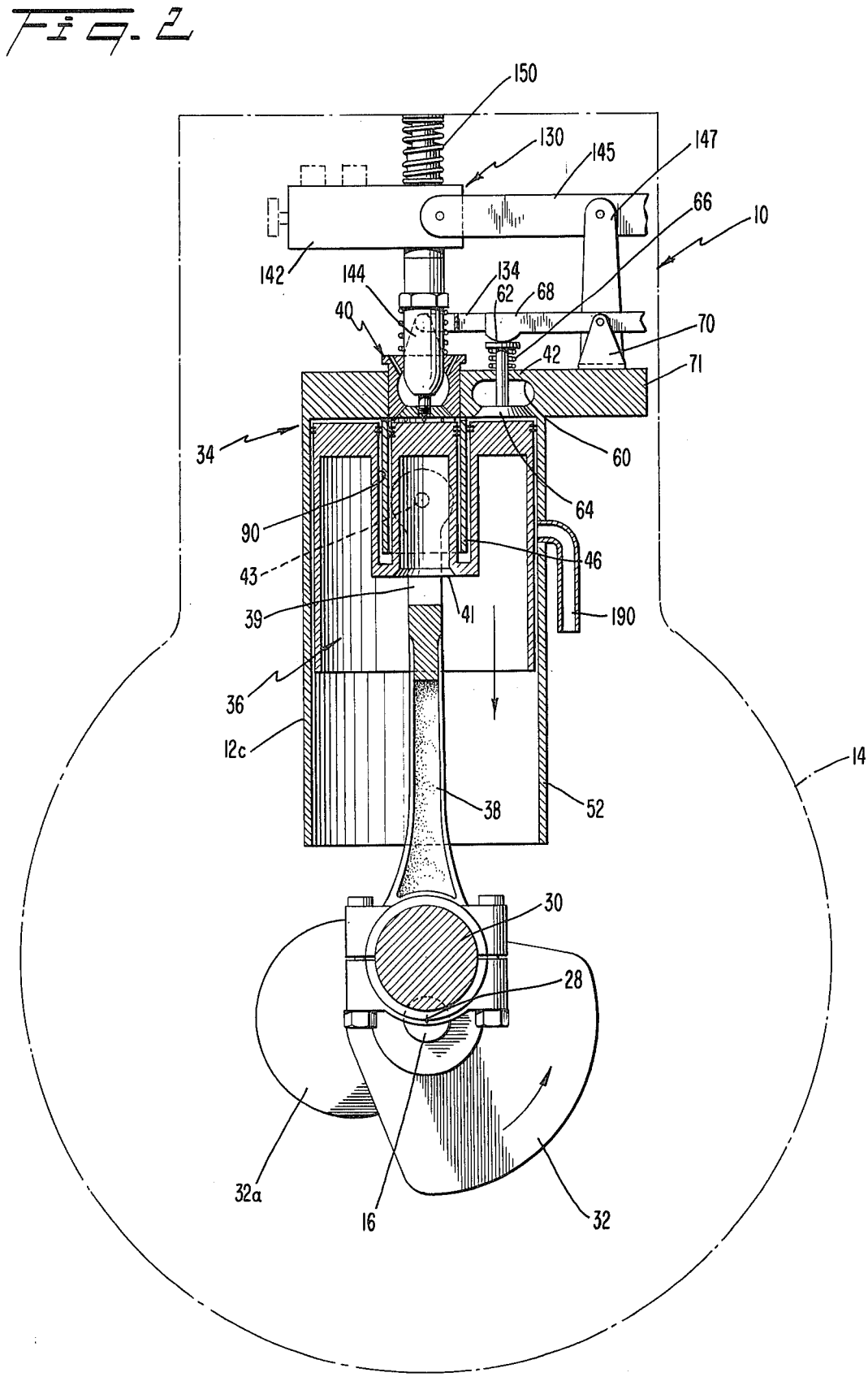

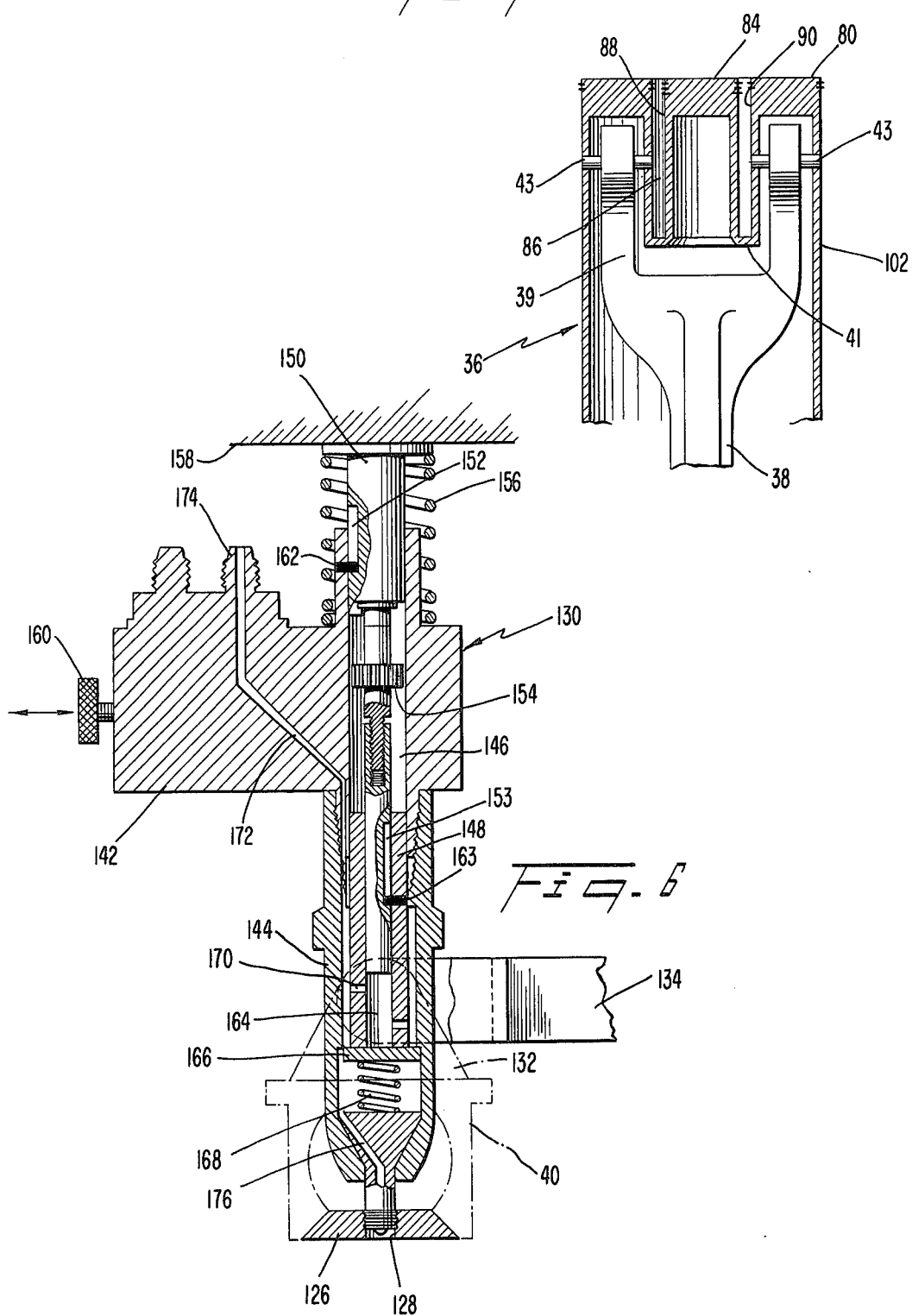

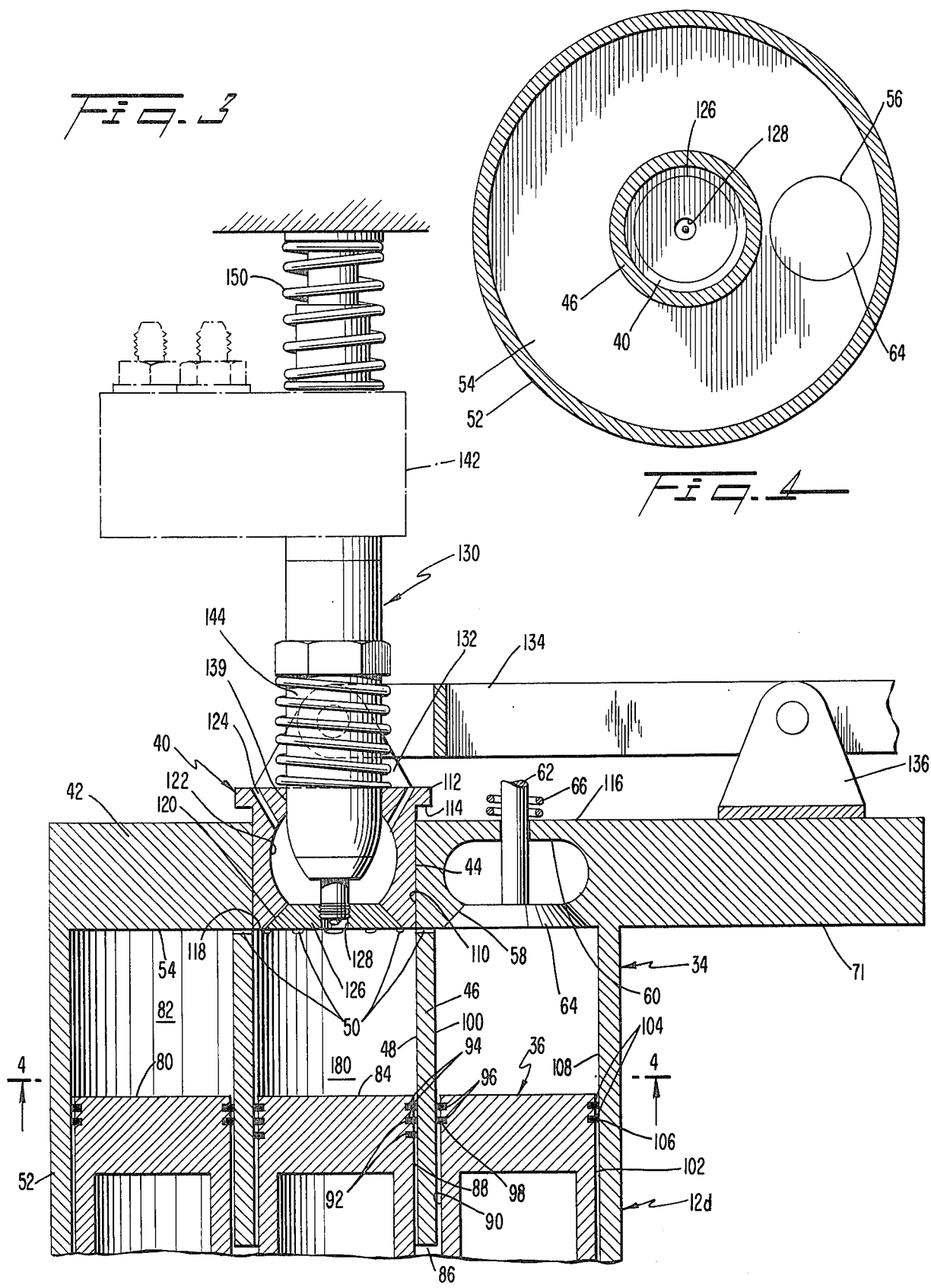

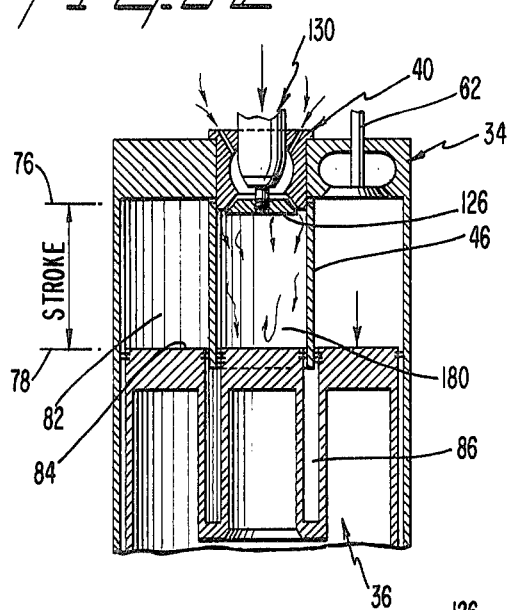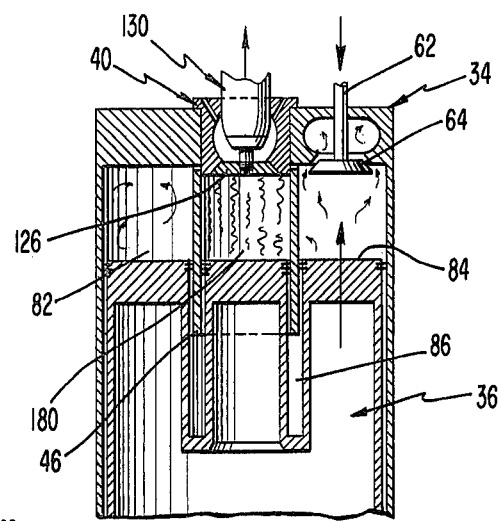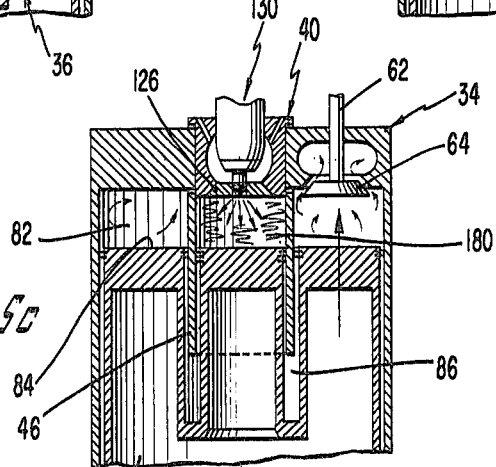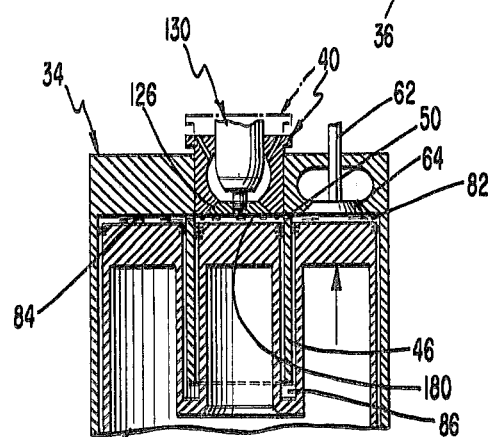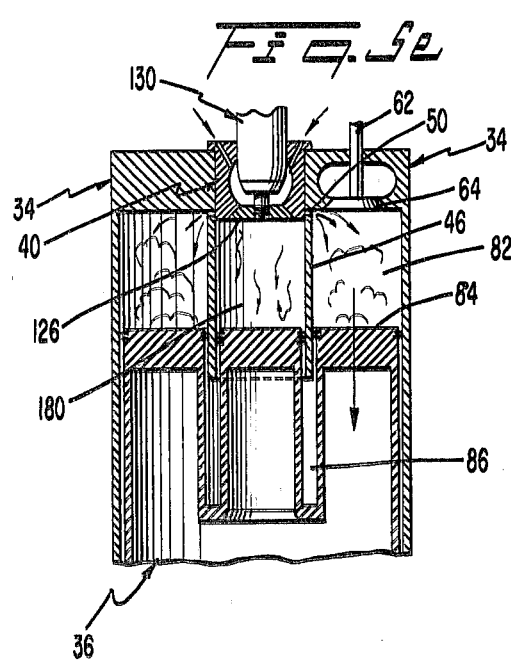

INTERNAL COMBUSTION ENGINE METHOD AND APPARATUS

BACKGROUND OF THE INVENTION

This invention relates generally to internal combustion engines and more particularly concerns a method and a piston cylinder assembly used therewith to increase overall cycle efficiency.

Internal combustion engines have long been known which generate useful power from a charge of fuel mixed with atmospheric air. Typically, internal combustion engines operate in accordance with Otto cycle or a Diesel cycle, both of which are classically studied thermodynamic cycles. The ideal Diesel cycle is distinguished from the ideal Otto cycle by the manner in which heat addition occurs: the ideal Diesel cycle uses a constant pressure heat addition; whereas, the ideal Otto cycle uses a constant volume heat addition.

The piston cylinder combinations used in conventional internal combustion engines comprise a unitary piston operably connected to a crankshaft by a connecting arm so as to reciprocate in a cylinder block. The cylinder block is provided with suitable conventional valves to regulate the inlet of fuel and air to a chamber defined by the cylinder block and the piston and to regulate the exhaust of spent combustion products from the chamber. The unitary piston has an invariant stroke which may be defined as the distance between uppermost and lowermost positions of the piston with respect to the cylinder block.

Since typical engines compress a combustible charge to a fraction of the initial volume of the chamber and, after ignition, allow resulting combustion products to expand to a volume substantially the same as the initial volume of the chamber, the piston-cylinder assemblies of most known conventional engines have a volume ratio between the expanded volume and the precompression volume of 1:1.

The known internal combustion engines typically reject large quantities of unused heat to the atmosphere when the exhaust valves open at the end of an expansion portion of the thermodynamic cycle. Failure to utilize such heat contributes to low thermodynamic cycle efficiency. Since combustion of a charge of air and fuel also creates a relatively high pressure level in the chamber, opening the exhaust port releases a pressure pulse to the atmosphere. This pressure pulse is, of course, wasted energy and is a source of acoustic noise which requires a muffler. A muffler generates a back pressure that must be overcome by the exhaust gas pressure and thus reduces the completeness of the cycle exhaust.

The foregoing considerations contribute to an extremely low thermodynamic cycle efficiency for both Otto cycle and Diesel cycle internal combustion engines.

Recently, great emphasis has been placed upon the reduction and elimination of pollutant gases generated by internal combustion engines. In this connection, numerous pollution control devices have been proposed for use as an additional component of an internal combustion engine. The known pollution control devices generally attack the problem of pollution from an external viewpoint. For example, the fuel mixtures are adjusted, the ignition temperature is lowered and/or miscellaneous paraphernalia and contrivances are installed externally of the internal combustion engine. None of these external pollution control devices adequately addresses the problem of high gas temperature and formation of pollutant gases while improving fuel economy and thermodynamic cycle efficiency. Moreover, many existing devices reduce cycle efficiency and increase back pressure on the internal combustion engine thereby making cold weather starting difficult, a particular disadvantage in northern climates.

Recently, the energy consumption of internal combustion engines using petroleum fuels has become a matter of increasing concern. Generally, it is recognized that substantial quantitites of energy are wasted by internal combustion engines by virtue of the pressure and temperature of the exhaust products. The poor energy utilization of internal combustion engines combined with the significantly increased cost of fuel has also given rise to a quest for new and improved techniques for lowering the fuel consumption. Ordinarily, the particular fuels, fuel additives, carburetion techniques and overall compression ratios of the internal combustion engines are varied with a myriad of perturbations in an effort to obtain improved fuel consumption.

While the multifarious techniques envisioned and advanced by various sources have met with varying degrees of success, each of these techniques is generally unsuitable for retrofitting an existing internal combustion engine without substantial losses in power output, substantial difficulties in making the necessary mechanical modifications, and the like. In addition, some efforts to overcome the problems of poor fuel consumption and the generation of polluting gases have resulted in such different operating principles as rotary engines. Rotary engines, however, do not make use of the great bulk of available experience and data which has been developed in connection with conventional reciprocating piston internal combustion engines.

In one proposal, which has not met with acceptance as a viable engine, an internal combustion engine has been fitted with a multipart, variable speed piston assembly which reciprocates within a cylinder having a pair of chambers to receive, compress, expand and exhaust a combustible charge. The mechanical complexity of a variable speed piston buried at the innermost regions of an internal combustion engine has most certainly contributed to the lack of interest in the Osterman internal combustion engine (U.S. Pat. No. 1,139,713). While the Osterman patent provides an internal combustion engine in which the volume ratio between a final expanded volume and the precompression volume is approximately 2:1, the Osterman patent does not reduce or eliminate the need for a muffler and does not appreciate the beneficial increase in overall thermodynamic cycle efficiency which may be obtained from an internal combustion engine.

Accordingly, it will be apparent that the need continues to exist for an internal combustion method and apparatus suitable for use in internal combustion engines, with minimum modifications, to improve power generation while reducing energy wasted in temperature and pressure of exhaust gases.

OBJECTS AND SUMMARY OF THE INVENTION

It is therefore an object of the present invention to provide a novel piston cylinder assembly for use on new internal combustion engines and for use in retrofitting existing internal combustion engines with a minimum of external modification.

It is another object of the present invention to provide a novel piston cylinder assembly which is capable of expanding the products of combustion in an internal combustion engine to a pressure essentially near or below atmospheric pressure.

A further object of the present invention is to provide a novel piston cylinder assembly which radically increases the thermodynamic cycle efficiency for the associated internal combustion engine.

Still another object of the present invention is to provide a method of operating an internal combustion engine in which the transfer of a compressed charge from a receiving compressing chamber to an expanding exhausting chamber is regulated by the reciprocation of a movable head assembly that cooperates in defining one of the chambers.

The above, as well as many other objects of the present invention, are essentially fulfilled by an internal combustion engine having a piston cylinder assembly comprising cylinder means having a wall with a port therethrough; piston means slidably mounted to reciprocate through a stroke relative to the cylinder means, having a first piston surface with a first area that cooperates with the cylinder means to define a first chamber, a second piston surface with a second area substantially smaller than the first area, and a groove separating the first piston surface from the second piston surface, the groove having a depth exceeding the stroke and being operable to receive the wall during reciprocation of the piston means; and reciprocable head means slidably mounted on the cylinder means, cooperating with the second piston surface and the cylinder means to define a second chamber, operable to control communication between the first chamber and the second chamber by valving the port and operable to recede from the second chamber as the second piston surface intrudes thereinto so as to maintain a predetermined schedule of the volume of the second chamber until the port opens to establish communication with the first chamber.

The apparatus described above derives useful work from a gaseous charge and fuel in an internal combustion engine by ingesting a gaseous charge into the central chamber defined by the piston means, the cylinder means and the movable head means; compressing the gaseous charge by moving the piston means into the central chamber; supplying a quantity of fuel to the central chamber to create combustible mixture with the gaseous charge; moving the movable head means to maintain a predetermined schedule of compression ratio in the central chamber; igniting the combustible mixture of the gaseous charge and the fuel quantity to increase temperature and pressure of resulting combustion products; transferring at least a portion of the combustion products from the central chamber to a surrounding chamber defined by the cylinder means and the cooperating second piston surface; expanding the combustion products in the surrounding chamber to atmospheric pressure by allowing the mixture to push against the second piston surface which is connected to a shaft that performs work; and exhausting the expanded combustion products from the surrounding chamber.

BRIEF DESCRIPTION OF THE DRAWINGS

Many objects and advantages of the internal combustion engine of this invention will be apparent to those skilled in the art when this specification is read in conjunction with the attached drawings wherein like reference numerals have been applied to like elements and wherein:

FIG. 2 is a partial corss-sectional view taken along the line 2—2 of FIG. 1 with the valve actuating assembly removed in the interest of clarity;

FIG. 2a is a partial cross-sectional view taken through the piston assembly to illustrate the connecting rod details;

FIG. 3 is an enlarged view of the upper portion of FIG. 2 with the piston assembly in a different position and the valve actuating assembly removed in the interest of clarity;

FIG. 4 is a cross-sectional view taken along the line 4—4 of FIG. 3;

FIGS. 5a, 5b, 5c, 5d, and 5e are partial cross-sectional views taken at different times in an operating cycle; and, FIG. 6 is a partial cross-sectional view of the fuel injector of FIG. 3.

DESCRIPTION OF THE PREFERRED EMBODIMENT

Figure 1:
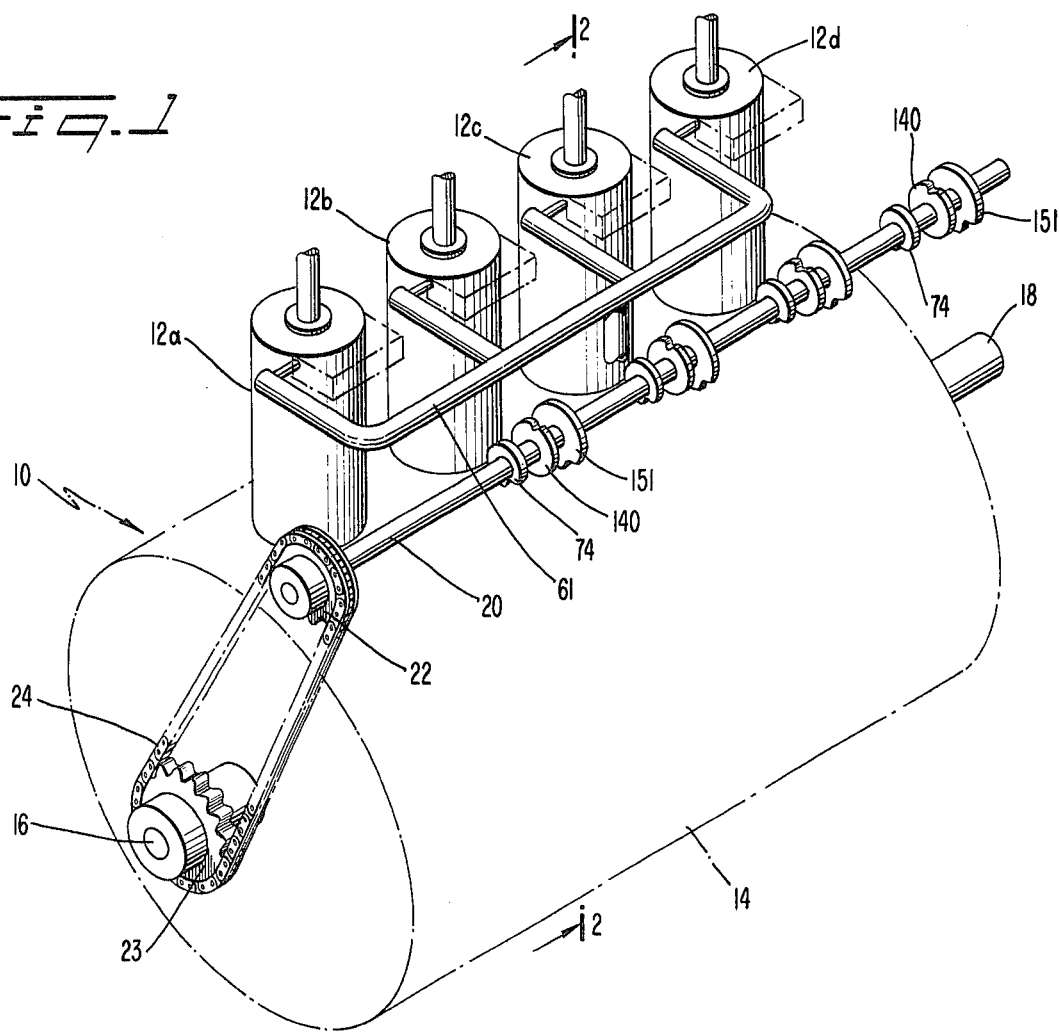
FIG. 1 is a schematic view of an overhead camshaft internal combustion engine having piston-cylinder assemblies according to the present invention with portions removed in the interest of clarity.

Turning now to FIG. 1, an overhead camshaft internal combustion engine 10 is schematically illustrated which includes four in-line piston cylinder assemblies 12a, 12b, 12c, and 12d. Each piston cylinder assembly is mounted on top of an engine block 14. Extending longitudinally through the engine block 14 is a suitable conventional crankshaft 16 which may have an end that projects from one end of the block 14. In addition, the crankshaft 16 is drivingly connected with an output shaft 18 which may extend from the opposite end of the engine block 14. Any suitable power-consuming device may be connected with the output shaft 18 so as to be driven thereby.

The engine 10 is also provided with an overhead camshaft 20 which may extend longitudinally along the engine block 14. The end of the camshaft 20 may be provided with a suitable conventional chain sprocket 22 which cooperates with a corresponding chain sprocket 23 on the projecting end of the crankshaft 16. The camshaft sprocket 22 is synchronized with the rotary motion of the crankshaft 16 by a timing chain 24 which interconnects the camshaft sprocket 22 with the crankshaft sprocket 23. The timing chain 24 and sprocket arrangement is a conventional one that is often used in internal combustion engines of the overhead camshaft variety. Naturally, an internal combustion engine having an internal camshaft is also within the scope of this invention.

The crankshaft 16 rotates about a longitudinal axis 28 (FIG. 2) and includes a plurality of laterally extending throws 30 which orbit the axis 28 as the crankshaft 16 rotates. One throw 30 is provided for each piston cylinder assembly of the internal combustion engine. Accordingly, the crankshaft 16 is provided with four lateral throws 30, one of which is associated with each of the piston cylinder assemblies. The crankshaft 16 also includes a plurality of counterbalance weights 32, 32a, as is conventional.

Each of the piston cylinder assemblies 12a, 12b, 12c, 12d is substantially identical and it will therefore suffice to describe one of the piston cylinder assemblies in detail. With continued reference to FIG. 2, the piston cylinder assembly 12d includes a fixed cylinder 34 having an axis of symmetry that may intersect the longitudinal axis 28 of the crankshaft 16. The cylinder assembly 34 may be rigidly connected to the internal combustion engine 10. The piston cylinder assembly 12d also includes a piston 36 which is slidably mounted within the cylinder 34 for reciprocating movement with respect thereto.

The piston 36 is connected by a suitable connecting link 38 with a corresponding throw 30 of the crankshaft 16. The connecting link 38 includes a yoke portion 39 (see FIG. 2a) which straddles a downwardly extending portion 41 of the piston 36. Suitable wrist pins 43 make a pivotal connection between each arm of the yoke portion and the piston 36 near the top thereof to reduce any tendency for binding between the piston 36 and the associated cylinder. In addition, by locating the pivotal connection near the top of the piston 36, the vertical height of the engine is reduced. Connection of the piston 36 to the crankshaft 16 by the connecting rod 38 causes the piston to reciprocate through a predetermined stroke as the crankshaft 16 turns.

The other basic element of each piston cylinder assembly 12d (see FIG. 2) is a reciprocable head 40 which is slidably mounted in the cylinder 34 in opposition to a central surface portion of the piston 36.

Turning now to FIG. 3, the cylinder 34 includes a generally annular disc 42 positioned at the upper end thereof. A generally cylindrical bore 44 is positioned along the axis of the disc 42 and is adapted to slidably receive the movable head 40.

Depending downwardly from the disc 42 is a first generally cylindrical wall 46 having a generally cylindrical inner surface 48 with a diameter essentially the same as the diameter of the cylindrical bore 44. The cylindrical wall 46 is provided with one or more ports 50 which extend therethrough to provide fluid communication. Thus, with the inner cylindrical surface 48 of the cylindrical wall 46 being of essentially the same diameter as the bore 44, movement of the movable head assembly 40 is effective to valve the ports 50.

A second cylindrical wall 52 depends downwardly from the outer circumferential edge of the disc 42. The first cylindrical wall 46 and the second cylindrical wall 52 are preferably concentric with one another and cooperate to define an annular cavity positioned below a bottom surface 54 of the disc 42. The bottom disc surface 54 has a generally circular opening 56 (see FIG. 4) which is the inlet to a valve passage (see FIG. 3) defined by a frustoconical surface 58 that extends convergently upwardly into the disc 42 and communicates with an exhaust passage 60 that is provided internally of the disc 42. The exhaust passage 60 is connected with a suitable conventional exhaust manifold 61 and exhaust system.

The frustoconical surface 58 of the disc 42 cooperates with a suitable conventional exhaust valve 62 which extends through the disc 42 of the cylinder 34 and is provided with a generally frustoconical valve surface 64. Vertical movement of the valve 62 causes an opening between the frustoconical surface or valve seat 58 of the disc 42 and the generally frustoconical surface 64 of the valve. In this manner, communication between the exhaust passage 60 and the annular recess defined by the cylinder 34 may be regulated.

Figure 1A:
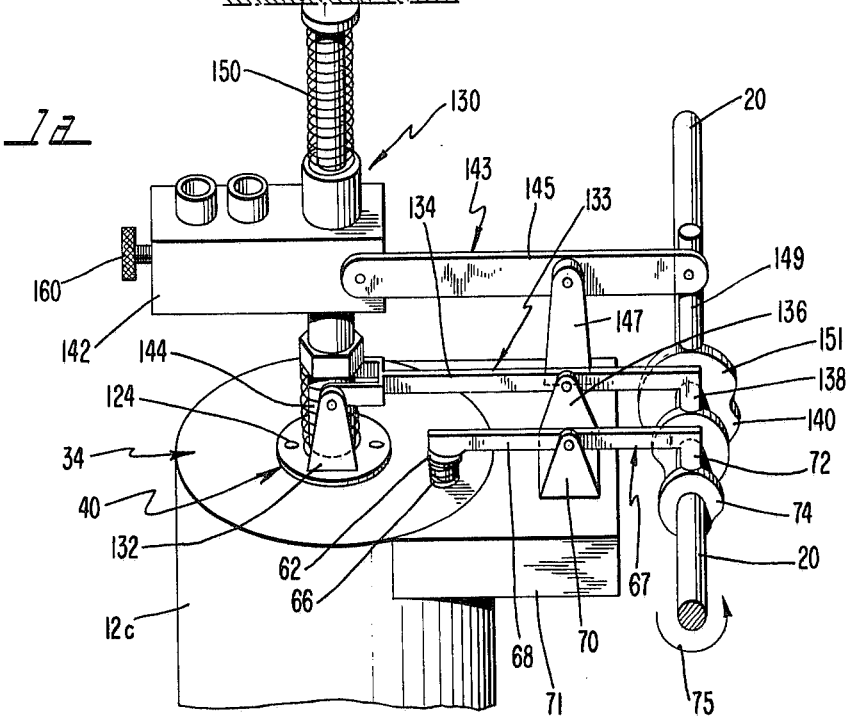
FIG. 1a is an enlarged pictorial view of the camshaft illustrating valve actuating assembly.

Returning briefly to FIG. 2, the valve 62 is spring biased such that the frustoconical surfaces 58, 64 are in engagement with one another. A valve spring 66 provides this resilient bias. To actuate the exhaust valve 62 (see FIG. 1a) an exhaust valve rocker arm assembly 67 is provided. The assembly includes an exhaust valve rocker arm 68 which is pivotally mounted on a rocker arm support 70 that may be mounted on a bracket 71 fixedly attached to the cylinder 34. The rocker arm 68 has a cam follower 72 which is actuated by the surface of an exhaust valve cam 74 provided on the camshaft 20. Accordingly, as the camshaft 20 rotates in the direction of arrow 75 the exhaust valve cam 74 causes rocking movement of the exhaust valve rocker arm 68. As the rocker arm 68 pivots about the support 70, movement of the exhaust valve 62 against the spring bias 66 is effected.

While one exhaust valve 62 has been illustrated, it should be apparent that, if desired, additional exhaust valves might be provided. With reference to FIG. 2, it will be observed that the second cylindrical wall 52 of the cylinder 34 has a length which is substantially greater than the length of the first cylindrical wall 46. The greater length of the second cylindrical wall 52 enables the second cylindrical wall 52 to guide the movement of the piston 36 as it reciprocates with respect thereto. As in conventional reciprocating engines, the piston 36 of the present invention reciprocates through a predetermined generally constant stroke relative to the cylinder 34. Turning briefly to FIG. 5a, the stroke may be defined as the distance between the uppermost position 76 of the piston 36 and the lowermost position 78 of the piston 36 with respect to the cylinder 34. The uppermost position 76 is often referred to as top dead center and the lowermost position 78 is often referred to as bottom dead center. The length of the first cylindrical wall 46 is selected to exceed the length of the piston stroke.

Returning to FIG. 3, the piston 36 will now be described in detail. The piston 36 includes a first piston surface 80 which is generally annular and is positioned within the recess defined by the first cylindrical wall 46, the second cylindrical wall 52 and the bottom surface 54 of the cylinder 34. In this manner, the first piston surface portion 80 and the cylinder 34 cooperate to define a variable volume annular chamber 82.

Centrally positioned on the piston 36 is a second piston surface portion 84 which is generally circular and is peripherally surrounded by the first piston surface portion 80. The first piston surface portion 80 and the second piston surface portion 84 are radially spaced from one another by an annular groove 86 which is defined by a pair of generally cylindrical walls 88, 90. The annular groove 86 (see FIG. 5a) receives the first cylindrical wall 46 of the cylinder 34. Accordingly, the annular groove 86 has a depth selected so as to accommodate the cylindrical wall 46 throughout the reciprocating stroke of the piston 36.

The wall 88 of groove 86 (see FIG. 3) is provided with a plurality of circumferentially extending channels 92 adjacent the second piston surface portion 84. The circumferential channels 92 are each provided with a corresponding suitable conventional seal ring 94 that creates a sliding pressure seal between the inner cylindrical surface 48 of the cylindrical wall 46 and the adjacent cylindrical wall 88 of the groove 86. In a similar fashion the outer cylindrical wall 90 of the groove 86 is provided with a plurality of circumferentially extending channels 96 each of which is provided with a corresponding suitable conventional seal ring 98. The seal rings 98 provide a sliding pressure seal between the outer cylindrical surface 90 of the groove 86 and the adjacent outer cylindrical surface 100 of the cylindrical wall 46.

A generally cylindrical surface 102 extends downwardly from the outer peripheral edge of the first piston surface portion 80 and includes a plurality of circumferentially extending channels 104 each of which receives a corresponding suitable conventional seal ring 106. The seal rings 106 provide a sliding pressure seal between the outer surface 102 of the piston 36 and an inner cylindrical surface 108 of the second cylindrical wall 52 of the cylinder 34.

With continued reference to FIG. 3, the reciprocable head 40 will now be described in detail. The reciprocable head 40 preferably has a substantially cylindrical surface portion 110 that is slidably received by the bore 44 of the cylinder disc portion 42. Suitable conventional sliding seals may be provided between the bore 44 and the cylindrical surface 110 as desired. The upper end of the cylindrical surface 110 terminates in a radially outwardly extending flange 112 which protrudes to define a shoulder 114 that provides a mechanical abutment to limit the distance which the reciprocable head 40 projects into the cylinder 34. The cylindrical surface 110 has an axial length which is selected so that a portion of the cylindrical portion 110 will pass beyond the ports 50 in the first cylindrical wall 46 when the shoulder 114 abuts the top surface 116 of the cylinder disc portion 42.

A generally circular end surface 118 of the movable head 40 has a frustoconical valve seat 120 which terminates in a cavity 122 provided in the movable head 40. The chamber 122 communicates with at least one intake passage 124 through which a gaseous charge such as air may enter the cavity 122.

Positioned within the valve seat 120 is a suitable valve 126 having a centrally disposed aperture 128. The valve 126 is carried by the end of a fuel injection assembly 130 which is substantially coaxial with the reciprocable head 40.

A pair of ears 132 (only one of which is shown) extends upwardly from the movable head 40 and straddle the fuel injection assembly 130. Each ear 132 (see FIG. 1a) is connected to a plug rocker arm 134 that is part of the assembly 133 which reciprocates the movable head 40 with respect to the fixed cylinder 34 and the piston 36. The plug rocker arm 134 is pivotally mounted on a suitable support 136 that may be fixed to the bracket 71. Movement of the plug rocker arm 134 is effected by a cam follower 138. The plug rocker arm 134 pivots about the support 136 by virtue of contact between the cam follower 138 and a plug cam surface 140 provided on the camshaft 20. Thus, rotary movement of the camshaft 20 causes translational movement of the movable head 40. It will be noted from FIG. 3 that the fuel injection assembly 130 is slidably received by a central bore 139 of the movable head 40. In this fashion the fuel injection assembly 130 and the head 40 can move independently so that the inlet valve 126 can be opened and closed.

Turning to FIG. 6, the fuel injection assembly is disclosed in cross section and will be described in detail. The fuel injection assembly 130 includes a housing comprising an upper portion 142 that may be threadably connected with a lower portion 144. The housing portion defines a centrally disposed bore 146 having a bushing 148 fixedly positioned at the lower end thereof. Reciprocably mounted in the bore 146 is a three piece plunger 150 having longitudinal slots 152, 153 that prevent rotation of the upper and lower pieces respectively, and a spur gear 154 connected to the middle piece. The plunger 150 is spring biased upwardly by a compression spring 156 and abuts a surface 158 of the engine. The upper housing portion 142 is provided with an adjustment rod 160 which is reciprocable within the upper housing portion 142. The control rod 160 is provided with a conventional gear rack (not shown) which meshes with the spur gear 154 to cause rotation of the middle piece about its longitudinal axis. The slots 152, 153 cooperate with corresponding pins 162, 163 to guide the plunger 150 longitudinally. The control rod 160 regulates the fuel quantity injected by the fuel injection assembly 130 by rotating the middle piece and thereby changing the distance between the upper and lower pieces.

The plunger 150 is slidably received in the bushing 148 and defines a fuel chamber 164. At the lower end of the fuel chamber 164 is a plate 166 which is biased upwardly by a spring 168 to provide a check valve at the lower end of the chamber 164. Fuel communications with ports 170 of the bushing 148 through a passage 172 that communicates with a fuel connection 174.

With fuel in the chamber 164, reciprocation of the plunger 150 with respect to the housing portions 142, 144 generates a fuel pressure which overcomes the bias of the spring 168 and allows a charge of fuel to move out of the chamber 164 and through a passage 176 which communicates with the aperture 128 of the valve disc 126. Thus, relative movement between the plunger 150 and the housing portions 142, 144 causes the injection of a quantity of fuel through the aperture 128. Relative movement between the plunger 150 and the upper and lower housing portions 142, 144 (see FIG. 1a) is effected by an injector rocker arm assembly 143. The injector rocker arm assembly 143 includes an injector rocker arm 145 that is pivotally connected to the upper housing portion 142 and which may be pivotally mounted on a support 147 connected to the bracket 71. A cam follower 149 carried by the rocker arm 145 engages an appropriately configured injector cam 151 carried by the camshaft 20. While the injector rocker arm assembly 145 and the plug rocker arm assembly cause reciprocating movement of the fuel injector assembly 130 and the movable plug 40, those assemblies also cause relative movement between the injector assembly 130 and the movable plug 40 which manipulates the inlet valve 126 (see FIG. 3).

The end surface 118 of the movable head 40, a cylindrical wall 46 of the cylinder 34, and the second piston surface portion 84 cooperate to define a second variable volume chamber 180 into which fuel from the fuel injection assembly 130 is dispensed. The chamber 180 is substantially cylindrical and has a volume which varies in response to movement of the piston 36 and in response to movement of the reciprocable head 40. The first piston surface portion 80 is preferably proportioned so as to have a substantially greater surface area than the surface area of the second piston surface portion 84. Accordingly, the volume of the chamber 180 will be substantially smaller than the volume of the annular chamber 82 which peripherally surrounds the central chamber 180.

Having described the structural details of the piston cylinder assembly, the operation of the piston cylinder assembly in the generation of work from a gaseous charge and a quantity of fuel will now be described with reference to FIGS. 5a, 5b, 5c, 5d and 5e.

Starting with the piston 36 at top dead center (see FIG. 5d), the movable head 40 and the fuel injector assembly slide downwardly into the central chamber 180 (see FIG. 5e) to close off the ports 50 and prevent further fluid communication between the central chamber 180 and the surrounding annular chamber 82.

As the piston 36 moves downwardly, the fuel injector assembly 130 and the inlet valve 126 of the movable head assembly 40 move further downward to establish fluid communication between the central chamber 180 and a gaseous source such as air. The fluid communication is established (see FIG. 3) through the passages 124, the cavity 122 and a space between the valve seat 120 and the valve disc 126. Continued downward movement of the piston 36 (see FIG. 5a) causes a gaseous charge to be ingested into the central chamber 180.

When the piston 36 has reached bottom dead center 78, the fuel injector assembly 130 and the valve plate 126 move vertically upwardly to seal the central chamber 180. The piston 36 then begins moving vertically upwardly (see FIG. 5b) and compresses the gaseous charge in the central chamber 180.

As the piston 36 nears the top end of its stroke (see FIG. 5c in which the distance is exaggerated for the purposes of clarity), the movable head assembly 40 and the fuel injection assembly 130 begin to move vertically upwardly and out of the central chamber 180. Thus, it is seen that the controlled movement of the movable head 40 relative to the fixed cylinder 34 is effective to control the amount of compression which occurs in the chamber 180 and, depending upon the shape of the cam surface 140 (see FIG. 1a), the volumetric change of the central chamber 180 (see FIG. 5c) will follow a predetermined schedule. The volume of the central chamber 180 may remain constant for a period of time at the end of the piston stroke, if desired. When the movable head assembly 40 and the fuel injection assembly 130 begin to recede from the chamber 180, the fuel injection assembly 130 begins to supply a predetermined quantity of fuel to the gaseous charge that has been compressed in the central chamber.

The fuel used in an internal combustion engine having the present piston cylinder assembly may be gasoline, diesel fuel or any other suitable combustible material. For the present example, the gaseous charge may be atmospheric air which is mixed with the fuel.

With continued movement of the piston 36 towards its top dead center position, the movable head 40 and the fuel injector assembly 130 recede even further from the central chamber 180 (see the dotted lines of FIG. 5d which illustrate its fully retracted position.) This receding movement of the movable head 40 completes the injection stroke necessary to fully inject a quantity of fuel into the central chamber 180 and cause mixing with the gaseous charge already therein. In addition, as the movable head 40 moves away from the advancing piston 36 it uncovers the ports 50 in the cylindrical wall 46 of the cylinder 34. In this manner, fluid communication is established between the central chamber 180 and the annular chamber 82. Having completed the fuel injection stroke, the movable head 40 and the fuel injection assembly 130 move toward the piston 36 to further compress the mixture of combustible fuel and the gaseous charge and expel the mixture from the central chamber 180 through the ports 50 to the annular chamber 82.

Actual ignition of the combustible mixture may occur spontaneously as the result of the temperature increase in the gaseous charge which occurs during compression. Alternatively, a suitable conventional spark plug (not shown) may be provided in the annular chamber 82 to ignite the combustible mixture.

After ignition of the combustible mixture, the combustion products which are formed have an increased pressure and temperature and expand pushing the piston 36 downwardly (see FIG. 5e) and, by virtue of the connection with the crankshaft, impart rotation thereto. The annular chamber 82 is sized such that its volume when the piston is at bottom dead center allows the pressure of the combustion products to be reduced to ambient pressure.

If desired, the chamber 82 may be sized so as to reduce the pressure of the combustion products below ambient. In this latter event, the crankcase of the internal combustion engine would need to be sealed and allowed to communicate with the annular chamber 82 at its bottom dead center position so that the pressure of the crankcase could be reduced to the fully expanded pressure prevailing at the end of the piston stroke at bottom dead center. Such communication may, for example, be provided by connecting a conduit 190 (see FIG. 2) to the fixed cylinder 34 at a position just above the bottom dead position of the piston assembly 36.

Having expanded the combustion products, the exhaust valve 62 (see FIG. 5b) moves vertically downwardly to establish communication between the exhaust system and the annular chamber 82. As the piston 36 moves vertically upwardly, the spent combustion products in the annular chamber 82 are exhausted from the chamber.

As a modification of the foregoing operation, the movable head 40 could be regulated so that the compression portion of the engine cycle takes place only in the central chamber 180 whereas the expansion and exhaust portions of the engine cycle which occur in both the central chamber 180 and the surrounding chamber 82.

Either the detailed description given above or the modification just described would permit use of the piston cylinder assembly in a four stroke thermodynamic cycle.

To use the piston cylinder assembly in a two stroke thermodynamic cycle, the ingestion of a fresh quantity of fuel and the expansion of combustion products may occur simultaneously (as illustrated in FIG. 5e). In addition, the compression of a fresh gaseous charge and the exhaustion of spent combustion products would also occur simultaneously (as illustrated in FIG. 5b).

If desired, the engine of this invention may be turbocharged or supercharged. The precompression resulting from such apparatus as a turbocharger or a supercharger is well known to increase thermodynamic cycle efficiency and will have the same effect on this engine.

At this point it will be apparent from elementary thermodynamic considerations that by virtue of the substantially increased volumetric expansion of the combustion products, as compared with conventional reciprocating engines, the temperature of the combustion products, when exhausted, is substantially reduced. In addition to the temperature reduction, by expanding the exhaust products to a pressure at or below ambient pressure, noise generating pressure pulses in the exhaust system are substantially eliminated if not completely avoided. Thus, the need for a muffler for an internal combustion engine having a piston cylinder assembly of the present invention is dispensed with.

While better utilization of thermal energy and elimination of an exhaust muffler are important, the piston cylinder assembly of the present invention also provides substantially increased thermodynamic cycle efficiency. More particularly, the ideal thermodynamic cycle efficiency of an Otto cycle engine may be defined as $e = 1 - [(T_4 - T_1)/(T_3 - T_2)]$. In the foregoing expression $T_4$ is the exhaust temperature of the expanded combustion products, $T_1$ is the temperature of the gaseous charge as it is ingested into the central chamber, $T_3$ is the temperature of the combustion products after ignition and $T_2$ is the temperature of the mixture immediately prior to ignition.

The corresponding relationship for the ideal thermodynamic cycle efficiency of the Diesel cycle is given by the following expression: $e = 1 - [(T_4 - T_1)/k(T_3 - T_2)]$. For the Diesel cycle the temperatures are selected at the same points as in the Otto cycle and the quantity $k$ is a ratio of specific heats of the gaseous material.

From the foregoing expression it will be observed that by lowering the temperature of the exhaust products, $T_4$, the ideal thermodynamic efficiency will be improved. The significance of the vastly increased expansion of the exhaust products in the piston cylinder assembly of the present invention is best illustrated by the following chart in which ideal efficiencies for a conventional 1:1 volume ratio (that ratio between the expanded volume and the precompression volume) piston cylinder assembly and an 8:1 volume ratio piston cylinder assembly are compared for both Otto cycle engines and Diesel cycle engines. In addition, an Otto cycle in which the exhaust products are expanded to atmospheric pressure is included in the comparison.

In the chart below, pressures are stated in atmospheres, temperature in degrees Rankine, and volumes are expressed as relative volumes ($V_r$) non-dimensionalized by the initial volume of the inner cylinder $V_1$. The subscripts refer to the following points in the cycle: subscript 1, conditions preceding compression; subscript 2, conditions following compression; subscript 3, conditions following combustion; and subscript 4, conditions following expansion.

In addition, the chart is set up such that all Otto cycles have the same compression ration ($V_2/V_1$), 8:1 with both Diesel cycles having a compression ratio of 15:1. The ideal energy supplied to each cycle (both Otto and Diesel) is held uniform among the cycles compared by adjusting the temperature rise $T_3 - T_2$ to reflect the effect of constant pressure and constant volume combustion assumptions. With the latter assumption, the amount of fuel supplied during each cycle will be uniform.

|  | Otto cycle | Otto cycle* (expanded to ambient) | Otto cycle* (expanded below ambient) | Diesel cycle | Diesel cycle* (expanded below ambient) |
|---|---|---|---|---|---|
| $P_1$ | 1.0 | 1.0 | 1.0 | 1.0 | 1.0 |
| $T_1$ | 580° R | 580° R | 580° R | 580° R | 580° R |
| $V_{r1}$ | 1.0 | 1.0 | 1.0 | 1.0 | 1.0 |
| $P_2$ | 14.9 | 14.9 | 14.9 | 33.9 | 33.9 |
| $T_2$ | 1082° R | 1082° R | 1082° R | 1306° R | 1306° R |
| $V_{r2}$ | 0.125 | 0.125 | 0.125 | 0.0666 | 0.0666 |
| $P_3$ | 42.4 | 42.4 | 42.4 | 33.9 | 33.9 |
| $T_3$ | 3082° R | 3082° R | 3082° R | 2820° R | 2820° R |
| $V_{r3}$ | 0.125 | 0.140 | 0.140 | 0.144 | 0.144 |
| $P_4$ | 2.84 | 1.0 | 0.222 | 2.73 | 0.183 |
| $T_4$ | 1650° R | 1300° R | 917° R | 1575° R | 846° R |
| $V_{r4}$ | 1.0 | 2.49 | 8.0 | 1.0 | 8.0 |
| $V_2/V_1$ | 0.125 | 0.125 | 0.125 | 0.0666 | 0.0666 |
| $V_3/V_2$ | 1.0 | 1.12 | 1.12 | 2.16 | 2.16 |
| $V_4/V_3$ | 8.0 | 17.8 | 57.1 | 6.95 | 55.6 |
| $V_4/V_1$ | 1.0 | 2.49 | 8.0 | 1.0 | 8.0 |
| k | 1.3 | 1.3 | 1.3 | 1.3 | 1.3 |
| e | 46% | 64% | 83% | 49.5% | 86.5% |

*Cycles corresponding to the practice of the present invention.

From the foregoing chart it will be seen that the piston cylinder assembly of the present invention effects a substantial increase in thermodynamic cycle efficiency. Moreover, as noted above, the efficiency can be further increased by conventional turbocharging or supercharging techniques.

By virtue of the relatively small piston surface area of the second piston surface portion, a smaller force is required for compression of the gaseous charge ingested into the second chamber 180. Advantageously, this smaller force requires less energy and contributes to the increased cycle efficiency.

In addition, by allowing the piston cylinder assembly to expand the combustion products to essentially atmospheric pressure or, by venting the crankcase to the cylinder so as to reduce crankcase pressure below atmospheric pressure, the back pressure associated with a conventional muffler assembly can be substantially eliminated.

Moreover, by virtue of the substantially reduced exhaust gas temperatures, the temperature of metal portions of the cylinder 34, the movable head 40 and the piston 36 are substantially reduced. The low exhaust temperature permits the metal materials to be used without liquid cooling resulting in a smaller engine block since cooling passages can be eliminated. And, the lower temperatures permit use of comparatively lighter materials than those heretofore used. Clearly, a smaller engine block is also advantageous in that it is substantially lighter. Thus, an internal combustion engine with a piston and cylinder assembly according to the present invention is adaptable for use where a lightweight engine is required.

A further advantage of the present invention resides in the more complete combustion of the fuel and gaseous oxidizer which results from more time in the expanding chamber 82 and the proportionately greater space available for expansion.

A further advantage of the present invention is that the compression ratio of the central chamber may be easily adjusted by appropriately designing the rotary cam 140 carried by the camshaft 20.

A still further advantage of the present invention is the reduced back pressure on the pistons which may be generated when the crankcase is evacuated to below atmospheric pressure by venting the crankcase to the cylinder at or near bottom dead center. In this manner, the pressure differential across the first piston surface portion 84 is increased throughout the power stroke of the piston assembly.

The piston cylinder assembly is not only advantageously used in new internal combustion engines, but is also well suited for retrofitting existing engines of the type having exposed cylinders. In this connection by removing the old cylinder and piston, the new piston cylinder assembly can be readily installed. The only further modification required is to provide the valve actuation from the camshaft.

It will of course be obvious to those skilled in the art that numerous modifications of the present invention can be made without departing from the spirit and scope of this invention. In this connection, it will be apparent that the actual combustion of the charge may occur in the outer chamber by providing the cylinder assembly with a suitable conventional spark plug and ignition system. Moreover, the fuel injector which is disclosed in the preferred embodiment may be replaced by suitably carbureting a combustible mixture which is ingested into the second chamber during the intake stroke.

It should now be apparent that a piston cylinder assembly constructed in accordance with the present invention substantially satisfies the objects and advantages set forth above. Moreover, it will be apparent to those skilled in the art that numerous modifications, variations, substitutions and equivalents for the features of the present invention may be made without departing from the spirit and scope of the invention. Accordingly, it is expressly intended that all such modifications, variations, substitutions and equivalents which fall within the spirit and scope of the invention as defined in the appended claims be embraced thereby.

What is claimed is:

1. A method of deriving useful work from a gaseous charge and fuel in an internal combustion engine comprising the steps of:
   ingesting a gaseous charge into a central chamber defined by a piston, a cylinder and a movable head;
   compressing the gaseous charge by moving the piston into the central chamber;
   supplying a quantity of fuel to the chamber to create a combustible mixture with the gaseous charge;
   moving the movable head to maintain a predetermined schedule of compression ratio in the central chamber;
   igniting the combustible mixture of the gaseous charge and the fuel quantity to increase temperature and pressure of resulting combustion products;
   transferring at least a portion of the combustion products from the central chamber to a surrounding chamber defined by the cylinder and a cooperating second piston;
   expanding the combustion products in the surrounding chamber to atmospheric pressure by allowing the combustion products to push against the second piston which is connected to a shaft that performs work; and
   exhausting the expanded combustion products from the surrounding chamber.

2. The method of claim 1 wherein:
   the steps of transferring includes substantially all of the combustion products;
   the steps of ingesting and expanding are concurrent, and
   the steps of compressing and exhausting are concurrent so that the internal combustion engine operates with a two stroke cycle.

3. The method of claim 1 wherein the steps of expanding and exhausting occur in both the central chamber and the surrounding chamber so that the internal combustion engine operates on a four stroke cycle.

4. The method of claim 1 wherein the steps of ingesting and supplying are concurrent and wherein the igniting step is spontaneously effected by a temperature rise associated with the compressing step so that externally-induced ignition is eliminated.

5. The method of claim 1 wherein the step of igniting is externally induced by generating a spark in the central chamber.

6. The method of claim 1 wherein the step of supplying is effected by injecting the quantity of fuel directly into the central chamber at an end portion of the compressing step so as to form a combustible mixture.

7. The method of claim 6 wherein the step of igniting is spontaneously effected due to a temperature rise associated with the compressing step so that externally induced ignition is eliminated.

8. The method of claim 6 wherein the step of igniting is externally induced by generating a spark in the central chamber.

9. The method of claim 1 wherein the step of expanding includes reducing the pressure of combustion products to a value below atmospheric pressure to increase the pressure differential acting across the second piston.

10. A method of operating an internal combustion engine at high cycle efficiency comprising the following steps:
    compressing an initial volume of gas to a predetermined fraction of the initial volume in a piston cylinder assembly;
    forming a combustible mixture by adding fuel to the gas;
    transferring the compressed combustible mixture to a second piston cylinder assembly;
    igniting the combustible charge to create combustion products at elevated temperature and pressure; and lowering the pressure of the combustion products in the second piston cylinder assembly to an essentially ambient value by expanding the combustion products to a volume substantially greater than the initial volume and simultaneously lowering the temperature of the combustion products so as to inhibit generation of pollutants.

11. The method of claim 10 wherein the mixture forming step occurs before the compressing step so that conventional automotive carburetion can be used.

12. The method of claim 10 wherein the mixture forming step occurs after the compressing step has begun so that comparatively large compression ratios can be attained without spontaneous ignition of the mixture.

13. The method of claim 10 wherein the forming step includes injecting fuel directly into the cylinder.

14. A piston cylinder assembly for use in an internal combustion engine comprising:
    cylinder means having a wall with a port therethrough;
    piston means slidably mounted to reciprocate through a stroke relative to the cylinder means, having a first piston surface with a first area that cooperates with the cylinder means to define a first chamber, a second piston surface with a second area substantially smaller than the first area, and a groove separating the first piston surface from the second piston surface, the groove having a depth exceeding the stroke and being operable to receive the wall during reciprocation of the piston means; and reciprocable head means slidably mounted on the cylinder means, cooperating with the second piston surface and the cylinder means to define a second chamber, operable to control communication between the first chamber and the second chamber by valving the port and operable to recede from the second chamber as the second piston surface intrudes thereinto so as to maintain a predetermined schedule of the volume of the second chamber until the port opens to establish communication with the first chamber.

15. The piston cylinder assembly of claim 14 wherein the second piston surface is generally circular and the first piston surface is generally annular and concentric with the second piston surface.

16. The piston cylinder assembly of claim 14 further including ignition means communicating with the second chamber and operable to ignite a combustible mixture therein.

17. The piston cylinder assembly of claim 16 wherein the ignition means is a fuel injector mounted in the reciprocable head means and operable in response to movement of the reciprocable head means to inject fuel into the second chamber.

18. The piston cylinder assembly of claim 14 wherein the first chamber has a first volume and the second chamber has a second volume, the first and second volumes being variable between maximum and minimum values as the piston means reciprocates, and the first volume being selected such that the pressure of expanding combustion products in the first volume is reduced at least to substantially ambient pressure when the first chamber reaches its maximum volume so as to substantially reduce temperature of the combustion products and increase cycle efficiency.

19. The piston cylinder assembly of claim 18 wherein the second volume is selected such that the pressure of expanding combustion products in the first volume is reduced to a value below ambient pressure.

20. In an internal combustion engine having a piston-driven power output shaft and a rotary camshaft, an improved piston assembly operable to provide high thermodynamic cycle efficiency comprising:

piston means operably connected to the power output shaft for movement in a reciprocating stroke, having a first piston surface with a first area, a second piston surface with a second area substantially smaller than the first area, and a groove separating the first piston surface from the second piston surface, the groove having a depth exceeding the stroke; cylinder means having a wall received by the groove, and a port through the wall, and cooperating with the second piston surface to define a first chamber for expanding and exhausting combustion products; and reciprocable head means cooperating with the second piston surface and the cylinder means to define a second chamber for ingesting and compressing a gaseous mixture, operable to control communication between the first chamber and the second chamber by valving the port and operable to recede from the second chamber as the second piston surface intrudes thereinto so as to maintain a predetermined fractional volume of the second chamber until the port opens to establish communication with the first chamber.

21. The internal combustion engine of claim 20 wherein the first chamber has a volume selected to allow expansion of combustion products to a pressure value at least as low as the ambient value.

22. The internal combustion engine of claim 20 wherein the first chamber has a volume substantially exceeding the volume of the second chamber when the piston means is at bottom dead center.

23. In a multicylinder internal combustion engine having a piston-driven power output shaft and a rotary camshaft, an improved piston cylinder assembly operable to provide high thermodynamic cycle efficiency comprising:

piston means operably connected to the power output shaft for reciprocating movement through a stroke, having a first piston surface with a first area and a second piston surface with a second area substantially smaller than the first area, a groove separating the first piston surface from the second piston surface, the groove having a depth exceeding the stroke;

cylinder means having a wall received by the groove, a port through the wall, and cooperating with the second piston surface to define a first chamber for expanding and exhausting combustion products; and reciprocable head means cooperating with the second piston surface and the cylinder means to define a second chamber for ingesting and compressing a gaseous mixture, operable to control communication between the first chamber and the second chamber by valving the port and operable to recede from the second chamber as the second piston surface intrudes thereinto so as to maintain a predetermined fractional volume of the second chamber until the port opens to establish communication with the first chamber.

* * * * *